(12) United States Patent
Gangai

(10) Patent No.: US 8,049,921 B2
(45) Date of Patent: Nov. 1, 2011

(54) SYSTEM AND METHOD FOR TRANSFERRING INVOICE DATA OUTPUT OF A PRINT JOB SOURCE TO AN AUTOMATED DATA PROCESSING SYSTEM

(75) Inventor: Daniel P. Gangai, Hampton, NH (US)

(73) Assignee: Bottomline Technologies (de) Inc., Portsmouth, NH (US)

( * ) Notice: Subject to any disclaimer, the term of this patent is extended or adjusted under 35 U.S.C. 154(b) by 812 days.

(21) Appl. No.: 12/082,040

(22) Filed: Apr. 8, 2008

(65) Prior Publication Data

US 2008/0252924 A1    Oct. 16, 2008

Related U.S. Application Data

(63) Continuation-in-part of application No. 11/821,034, filed on Jun. 21, 2007.

(60) Provisional application No. 60/923,816, filed on Apr. 16, 2007.

(51) Int. Cl.
*G06K 15/00* (2006.01)
*G06F 3/12* (2006.01)

(52) U.S. Cl. .................... 358/1.18; 358/1.11; 358/1.15

(58) Field of Classification Search .............. 358/1.1, 358/1.5, 1.6, 1.9, 1.11, 1.13, 1.15, 1.16, 1.17, 358/1.18, 400, 401, 403, 404, 405, 407, 448, 358/468, 474; 705/68, 14.17, 14.23, 14.51, 705/24, 30, 40; 707/600, 607; 399/1, 8, 399/9, 10; 347/1, 2, 3, 5, 14, 23; 382/312, 382/317, 321

See application file for complete search history.

(56) References Cited

U.S. PATENT DOCUMENTS

| 2005/0010474 A1 * | 1/2005 | Desai .......................... 705/14 |
| 2005/0251477 A1 * | 11/2005 | Chang et al. .................. 705/40 |
| 2010/0023452 A1 * | 1/2010 | Brown ......................... 705/40 |

FOREIGN PATENT DOCUMENTS

WO    WO 0120504 A1 *    3/2001

* cited by examiner

*Primary Examiner* — Dov Popovici
(74) *Attorney, Agent, or Firm* — Timothy P O'Hagan

(57) ABSTRACT

A data capture system receives a sequence of document objects and, for each, writes output data values to a structure. A first tier extraction system is adapted to receive each document object. For each required data element, the first tier extraction system obtains identification of a positional element value from a positional data set that includes, as its data element, identification of the required data element; and, if the document object includes a qualifying text string, writes an output data value to the output data structure in association with identification of the required data element. A second tier extraction system receives each such document object that does not include a qualifying text string, performs character recognition on a graphical representation thereof and, for each required data element, writes an output data value to the output data structure in association with identification of the required data element.

16 Claims, 15 Drawing Sheets

| File Output Template 118 | | |
|---|---|---|
| Required Data Element 152 | XML Tag 154 | Data Value Rules 156 |
| Invoice Number | <Invoice_Number> | 5 Digits |
| Customer Name | <Customer_Name> | Up to 20 Characters |
| ... | ... | ... |

150 {

| Positional Identification Storage 122 | | | |
|---|---|---|---|
| Invoice Data Element 202 | Positional Element Value 204 | | |
| | X 204x | Y 204y | Variance 204v |
| 202a Vendor Name | x6.7 | y2.0 | .2 |
| 202b Customer Name | x4.3 | y5.0 | .2 |
| 202c Invoice Number | x3.5 | y5.8 | x=.7, y=.2 |
| 202d Line Item ID (LID) | x2.0 | y7.5 | x=.2, y=.5 |
| 202e Qty | x5.8 | LID + .5 | .2 |
| 202f Line Item ID | x2.0 | Previous LID + 1.5 | .2 |
| 202g Qty | x5.8 | LID + .5 | .2 |
| 202h Line Item ID | x2.0 | Previous LID + 1.5 | .2 |
| 202i Qty | x5.8 | LID + .5 | .2 |

Figure 8

| Character Recognition Data Sets | | |
|---|---|---|
| Recognized Character String 222 | Location 224 | |
| | X 224x | Y 224y |
| Supplier, Inc. | x6.7 | y2.0 |
| Invoice To: Customer, Inc. | x4.3 | y5.0 |
| Invoice: 0534, Date: mm/dd/yy | x3.5 | y5.8 |
| ... | | |

220 brackets the data rows.

Figure 10

| Customer A, Inc. | Customer A Inc. | Customer A Corp | } 72 |
|---|---|---|---|
| Customer A, Inc. | | | |
| Customer B | ..... | | |

{ Coordinates ~ 66a
66 { Preceding Character String ~ 66b
{ Metadata Tag ~ 66c

Figure 14

SYSTEM AND METHOD FOR TRANSFERRING INVOICE DATA OUTPUT OF A PRINT JOB SOURCE TO AN AUTOMATED DATA PROCESSING SYSTEM

TECHNICAL FIELD

The present invention relates to a print processor component, and more particularly, to a print processor component that accepts a document print sequence from a print job source and transfers invoice data from each invoice within the output to an automated data processing system.

BACKGROUND OF THE INVENTION

Typically a business will have an accounting software system that maintains a database of the business transactions with its customers, vendors, banks, and other third parties associated with the business as well as internal business transactions between internal accounts.

While these accounting systems facilitate record keeping and may reduce data entry for internal transactions, transactions between businesses have traditionally been handled by one business software system printing a document and the other business manually entering the transaction into their system using data from the printed document.

For example, referring briefly to FIG. 1, an accounting software system 10 may include a print job function 12. For purposes of printing invoices for distribution to customers, a user of the system 10 may select the print job function 12 for a group of invoices. In a known manner such user would then select an appropriate printer queue 18 from a printer folder managed by the operating system. The print job function 12 would then generate a sequence of document objects 16a-16e and direct such sequence of document objects 16a-16e to the identified driver/spooler 18 via an interface therewith.

The format of each document (e.g. each page) of each invoice 16a-16e may be the native output of the system 10 such as Enhanced Metafile (EMF), XML Paper Specification (XPS), or other paper/printer description language.

The printer queue 18 receives the sequence of document objects 16a-16e, converts the document format to a printer description language applicable to the printer 24 to which the job it to be sent (e.g. XPS, Post Script, Printer Control Language, etc), and stores each page in a buffer 20 for sending to the printer 24.

After printing, the invoices are stuffed into envelopes for mailing to the appropriate customer. The customer, upon receipt of the invoice, will likely enter invoice data through a manual data entry (MDE) screen provided by its accounting systems.

Recently various technologies have been developed to facilitate electronic exchange of transaction documents between trading partners. A problem exists in that a business is likely to have a group of trading partners with which it may exchange documents electronically. The remainder of its trading partners will still use traditional paper based document exchange systems.

Further yet, the groups are dynamically changing over time. First, a business's trading partners change over time as new customer/supplier relationships are established and some existing relationships are terminated. Secondly, customers and/or suppliers that have traditionally used paper based document exchange system may adopt electronic document exchange technologies.

Therefore, entering into electronic document exchange creates multiple challenges. First, adoption of an electronic document exchange technology may require costly upgrades to existing paper based document exchange systems. Secondly, a paper based document exchange option must be maintained for those trading partners that still utilize paper based systems. And thirdly, the business must have system for efficiently distinguishing which trading partners utilize each system in an environment where new trading relationships are being established and trading partner's that have traditionally used paper based systems are adopting electronic document exchange technologies.

Accordingly there is a need in the art for a system and method for facilitating use of electronic document exchange without requiring significant modification or upgrading of paper based document exchange systems. Further, there is a need in the art for a system and method for facilitating use of electronic document exchange in an environment wherein only a portion of a business's documents are exchanged electronically while the remaining portion are exchanged utilizing paper based document exchange systems. Further yet, there is a need in the art for a system and method for facilitating electronic document exchange in an environment wherein new trading relationships are being established and trading partners, that have traditionally used paper based document exchange systems, are adopting electronic document exchange systems.

SUMMARY OF THE INVENTION

A first aspect of the present invention comprises a data capture system for receipt of a sequence of at least one output document object and, for each output document object, writing output data values to an output data structure.

The system comprises a data storage and at least a first tier data extraction system and a second tier data extraction system. The data storage comprises a positional identification storage including at least two positional data sets. Each positional data set includes: i) identification of a required invoice data element; and ii) identification of a positional element value defining a location within a graphical representation of each output document object at which a text string representative of a value of the required invoice data element is positioned.

The first tier data extraction system is adapted to receive each output document object. Each output document object may be in a print language format comprising a plurality of print elements. Each print element includes a print component and at least one position identifier value identifying a position at which the print component is rendered within a graphical representation of the output document object. Each print component may be one of: i) a text string representing a value of an invoice data element; and ii) a graphic image.

The first tier data extraction system may be further adapted to, for each received output document object—and for each required invoice data element, obtain the identification of the positional element value from the positional data set that includes, as its invoice data element, identification of the required invoice data element.

If the output document object includes a qualifying text string, write an output data value to the output data structure in association with identification of the required invoice data element. The output data value may be one of: i) at least a portion of the qualifying text string; and ii) a numerical value represented by at least a portion of the qualifying text string. The qualifying text string may be a text string of a print element that includes a position identifier value that is within a predetermined variance from the positional element value of the positional data set. Alternatively, if the output document object does not include a qualifying text string, the output document object is identified for tier two processing.

The second tier data extraction system is adapted to receive, for each output document object identified for tier two processing, a tier two document. The tier two document may be the graphical representation of the output document object.

The second tier data extraction system may be further adapted to perform character recognition on the tier two document and construct a plurality of character recognition data sets. Each character recognition data set associates a recognized character string within the tier two document with an identification of its location within the tier two document.

The second tier data extraction system further, for each required invoice data element for which the first tier data extraction system failed to write an output data value to the output data structure: i) obtains the identification of the positional element value from the positional data set that includes, as its invoice data element, identification of the required invoice data element; and ii) if a character recognition data set includes a qualifying recognized character string, writes an output data value to the output data structure in association with identification of the required invoice data element.

The output data value may be one of: i) at least a portion of the qualifying recognized character string; and ii) a numerical value represented by at least a portion of the qualifying recognized character string. The qualifying recognized character string may be a recognized character string of a character recognition data set that includes a position identifier value that is within a predetermined variance from the positional element value of the positional data set.

In one sub-aspect, the second tier data extraction system may be further adapted to identify the tier two document for tier three processing if, for any required invoice data element, a qualifying recognized character string is not included in any character recognition data set constructed from the tier two document.

In this sub-aspect, a third tier identification system may be adapted to, for each tier two document identified for tier three processing, generate a graphical representation of the tier two document at a workstation.

For each required invoice data element for which the second tier data extraction system (in combination with the first tier data extraction system) failed to write an output data value to the output data structure: i) prompt for user input of an output data value; ii) receive user input of the output data value from a user workstation; and iii) write, to the output data structure, the output data value received from the workstation in association with identification of the required invoice data element.

In another sub-aspect, at least one positional element value includes an abscissa value and an ordinate value defining a Cartesian coordinate within the graphical representation of the output document object at which an origin of the text string is positioned.

In this sub-aspect, a qualifying text string may be a text string of a print element that includes a position identifier value identifying a position within the graphical representation of the output document object that is within a predetermined displacement from the Cartesian coordinate.

The qualifying recognized character string may be a recognized character string of a character recognition data set that includes a position identifier value identifying a position within the graphical representation of the output document object that is within a predetermined displacement from the Cartesian coordinate.

In yet another sub-aspect, the positional element value may include: i) a reference to a second invoice data element; ii) an abscissa value; and iii) an ordinate value. In this aspect: i) the abscissa value added to an abscissa value of the second invoice data element; and ii) the ordinate value added to an ordinate value of the second invoice data element define a Cartesian coordinate within the graphical representation of the output document at which an origin of the text string is positioned.

Again, the qualifying text string may be a text string of a print element that includes a position identifier value identifying a position within the graphical representation of the output document object that is within a predetermined displacement from the Cartesian coordinate.

Again, the qualifying recognized character string may be a recognized character string of a character recognition data set that includes a position identifier value identifying a position within the graphical representation of the output document object that is within a predetermined displacement from the Cartesian coordinate.

In yet another sub-aspect, the graphic image of at least one print component includes a pixelized representation of at least one character and the recognized character string of at least one character recognition data set includes characters matching the characters of the pixelized representation of at least one character.

In yet another sub-aspect, the data capture system may further comprise an accounting server. The accounting server may: i) credit an account for a first charge in the event all required invoice data elements are written to the output data structure by the first tier data extraction system; ii) credit the account for a second charge, different than the first charge if the second tier processing is required; and iii) credit the account for a third charge, different than both the first charge and the second charge, in the event the output document is identified for tier three processing. Second tier processing being required may mean: i) any required invoice data elements are written to the output data structure by the second tier data extraction system; and ii) the output document is not identified for tier three processing.

A second aspect of the present invention comprises a method for capturing data from a sequence of at least one output document object and, for each output document object, writing output data values to an output data structure.

The method comprises storing at least two positional data sets in a data storage. Each positional data set includes: i) identification of a required invoice data element; and ii) identification of a positional element value defining a location within a graphical representation of each output document object at which a text string representative of a value of the required invoice data element is positioned.

The method further includes receiving each output document object. Each output document may be in a in a print language format comprising a plurality of print elements. Each print element may include a print component and at least one position identifier value identifying a position at which the print component is rendered within a graphical representation of the output document object. Each print component may be one of: i) a character string representing a value of an invoice data element; and ii) a graphic image.

For each required invoice data element, the method may include performing a first tier data extraction process. The first tier data extraction process comprises obtaining the identification of the positional element value from the positional data set that includes, as its invoice data element, identification of the required invoice data element. If the output document includes a qualifying text string, an output data value is written to the output data structure in association with identification of the required invoice data element. Alternatively, if the output document object does not include a qualifying text string, the output document object is identified for tier two processing.

The output data value may be one of: i) at least a portion of the qualifying text string; and ii) a numerical value represented by at least a portion of the qualifying text string. The qualifying text string may be a text string of a print element that includes a position identifier value that is within a predetermined variance from the positional element value of the positional data set.

For each output document object identified for tier two processing, a second tier data extraction process is performed. The second tier data extraction process comprises performing character recognition on a graphical representation of the output document object and constructing a plurality of character recognition data sets. Each character recognition data set associates a recognized character string within the graphical representation with an identification of its location within the graphical representation.

For each required invoice data element for which an output data value was not written to the output data structure by the first tier extraction process, the method includes: i) obtaining the identification of the positional element value from the positional data set that includes, as its invoice data element, identification of the required invoice data element; and ii) if a character recognition data set includes a qualifying recognized character string, writing an output data value to the output data structure in association with identification of the required invoice data element.

The output data value may be one of: i) at least a portion of the qualifying recognized character string; and ii) a numerical value represented by at least a portion of the qualifying recognized character string. The qualifying recognized character string may be a recognized character string of a character recognition data set that includes a position identifier value that is within a predetermined variance from the positional element value of the positional data set.

In a sub-aspect, if, for any required invoice data element, a qualifying recognized character string is not included in any character recognition data set constructed from the tier two document, the tier two document is identified for tier three processing.

For each tier two document identified for tier three processing, a third tier data extraction process is preformed for each required invoice data element for which the second tier data extraction system failed to write an output data value to the output data structure. The third tier data extraction process may comprise: i) generating a graphical representation of the tier two document at a workstation; ii) prompting for user input of an output data value; iii) receiving user input of the output data value from the workstation; and iv) writing, to the output data structure, the output data value received from the workstation in association with identification of the required invoice data element.

In another sub-aspect, at least one positional element value may include an abscissa value and an ordinate value defining a Cartesian coordinate within the graphical representation of the output document object at which an origin of the text string is positioned.

In this sub-aspect, a qualifying text string may be a text string of a print element that includes a position identifier value identifying a position within the graphical representation of the output document object that is within a predetermined displacement from the Cartesian coordinate.

A qualifying recognized character string may be a recognized character string of a character recognition data set that includes a position identifier value identifying a position within the graphical representation of the output document that is within a predetermined displacement from the Cartesian coordinate.

In another sub-aspect, at least one positional element value includes: i) a reference to a second invoice data element; ii) an abscissa value; and iii) an ordinate value. In this sub-aspect: i) the abscissa value added to an abscissa value of the second invoice data element; and ii) the ordinate value added to an ordinate value of the second invoice data element define a Cartesian coordinate within the graphical representation of the output document object at which an origin of the text string is positioned.

Again, the qualifying text string may be a text string of a print element that includes a position identifier value identifying a position within the graphical representation of the output document object that is within a predetermined displacement from the Cartesian coordinate.

Again, the qualifying recognized character string may be a recognized character string of a character recognition data set that includes a position identifier value identifying a position within the graphical representation of the output document object that is within a predetermined displacement from the Cartesian coordinate.

In yet another sub-aspect, the graphic image of at least one print component includes a pixelized representation of at least one character and the recognized character string of at least one character recognition data set includes characters matching the characters of the pixelized representation of at least one character.

In yet another sub-aspect, the method may further comprise: i) crediting an account for a first charge in the event all required invoice data elements are written to the output data structure by the first tier data extraction system; ii) crediting the account for a second charge, different than the first charge, in the event: a) any required invoice data elements are written to the output data structure by the second tier data extraction system; and b) the output document is not identified for tier three processing; and iii) crediting the account for a third charge, different than both the first charge and the second charge, in the event the output document is identified for their three processing.

For a better understanding of the present invention, together with other and further aspects thereof, reference is made to the following description, taken in conjunction with the accompanying drawings. The scope of the invention is set forth in the appended claims.

BRIEF DESCRIPTION OF THE DRAWINGS

FIG. 8 is a diagram depicting positional identification storage in tabular form in accordance with an embodiment of the present invention;

FIG. 10 is a diagram depicting character recognition data sets in tabular form in accordance with an embodiment of the present invention;

FIG. 14 is a diagram representing distinguishing field identification in accordance with an embodiment of the present invention;

FIG. 15 is a diagram representing a group one database in accordance with an embodiment of the present invention;

DETAILED DESCRIPTION OF THE INVENTION

Figure 1:
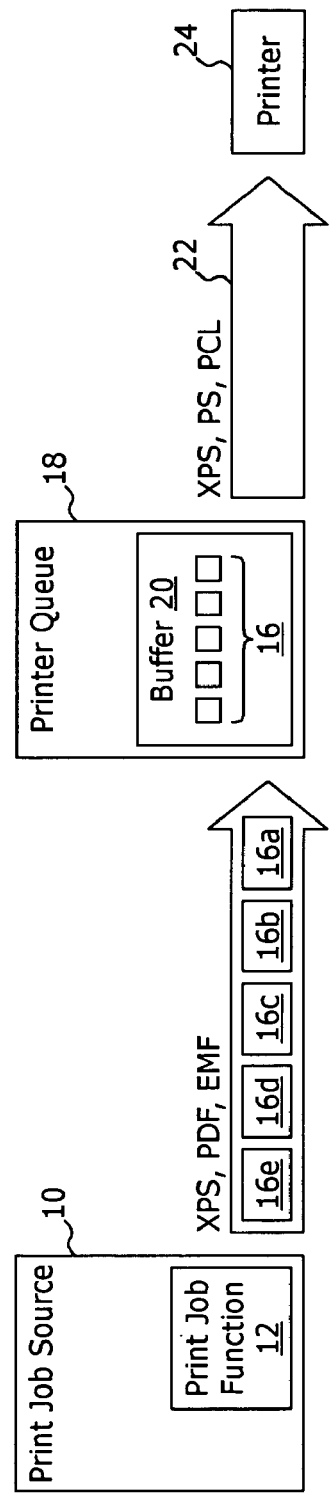
FIG. 1 is a block diagram representing known technology for printing a sequence of documents generated by a print job source.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

Figure 2:
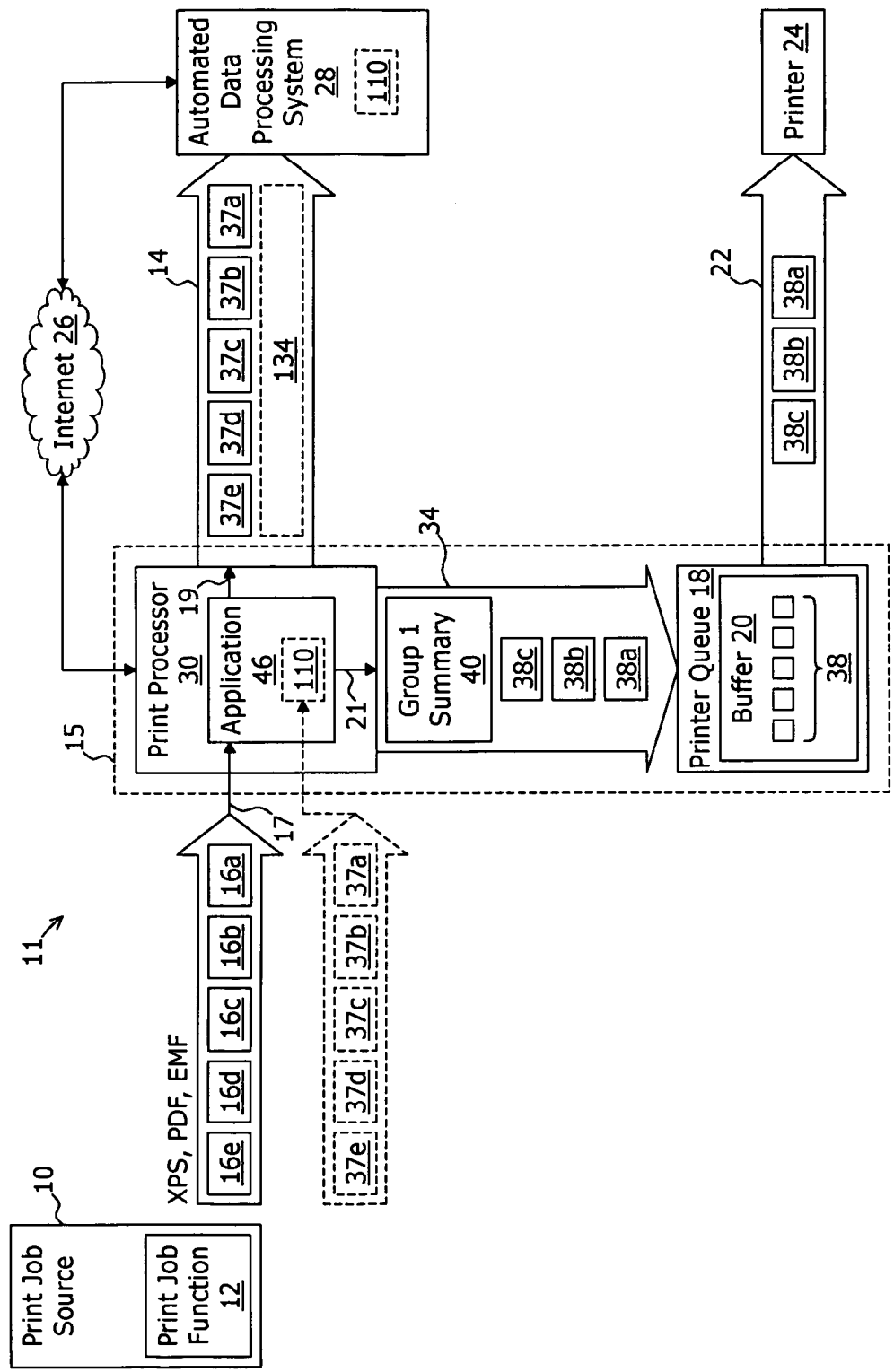
FIG. 2 is a block diagram representing architecture routing a first portion of a sequence of documents to an automated data processing system while routing a second portion to a printer in accordance with an embodiment of the present invention.

FIG. 2 illustrates exemplary architecture of a system 11 for transferring invoice data embodied in at least a first subset of invoice document object of an invoice document output array 16a-16e from a system 10 to an automated data processing system 28 in accordance with the present invention.

In the exemplary embodiment, a print job source 10 such as an accounting software system may include a print job function 12 which outputs a sequence of invoice document objects (i.e. invoice document output array 16a-16e). If the print job source 10 is a server based accounting system, a user of a client system may select the print job function 12 for identifying the sequence of document objects 16a-16e for printing and select an available printer from a printer folder 15.

For purposes of the present invention, the term printer folder means a sell known directory controlled by the operating system of a workstation that includes print drivers/spoolers (or includes shortcuts or links to the print drivers/spoolers) to which a user may send a print job. In the exemplary embodiment, the printer folder 15 includes both the print processor application 30 (or a short cut to the print processor application 30) and the printer queue 18 for a traditional printer.

For purposes of the present invention the term document object means an object representative of a page to be printed in the native output format of the print job function, Typical native output formats includes Portable Document Format (PDF), Enhanced Metafile (EMF), XML Paper Specification (XPS), or other paper/printer description language formats wherein a graphic rendering of document is described utilizing a language defining a combination of shapes and positions as opposed to a bit map.

More particularly each document object 16a-16e may include a plurality of descriptive print elements. Each print element may include a print component and at least one position identifier value. The print component describes or identifies the size and/or shape of a mark (or marks) to be rendered within a graphical representation of the document (i.e. the size and shape of a mark (or marks) to be printed on a page). Examples include an alpha-numeric character and/or its font and size, identification of lines and/or geometric shapes, and graphic objects such as a depiction of a symbol, logo, picture, or other graphic image.

The position identifier values identify a position at which the print component is rendered within a graphical representation of the document (i.e. the position at which the print component is printed on a printed page).

At least a portion of the print components may be character strings of at least one alpha numeric character—for example a character string representing a label for an invoice data element (for example "Invoice Number", "Invoice No." or "Invoice:") and a character string representing the invoice data element value, for example the actual invoice number such as "0534" following the label "Invoice Number", "Invoice No." or "Invoice:".

At least a portion of the print components may be graphic images. An exemplary graphic image may include a symbol, a logo, or grid lines forming a table within the document. Further, certain graphic images may include one or more character strings represented within the graphic image.

Figure 3:
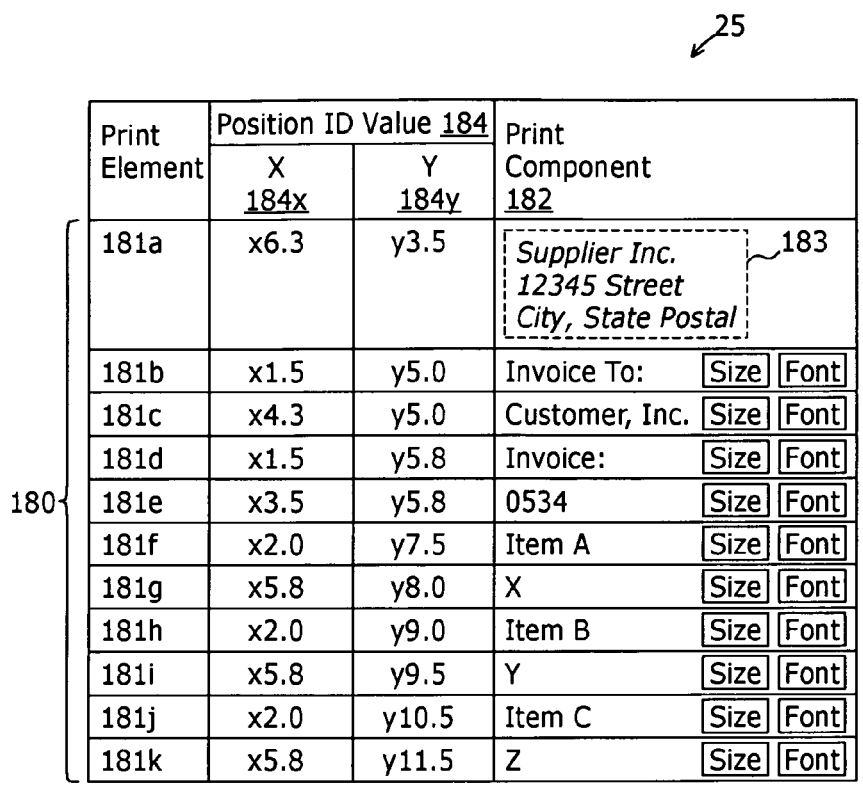
FIG. 3 is a diagram representing a portion of an invoice document object in a tabular form in accordance with an embodiment of the present invention.

Turning to FIG. 3, exemplary print elements 181 that may form at least a portion of a document object 16 are represented in tabular format for purposes of illustration. The table 25 includes a plurality of records 180, each of which is representative of one of the print elements 181a-181k and associates at least one position identifier value 184 of the print element 181a-181k with the print component 182 of the print element 181.

In the exemplary embodiment, the position identifier value 184 may include an abscissa value 184x (or "X" coordinate value) and a ordinate value 184y (or "Y" coordinate value) which in combination define a Cartesian coordinate within a graphical representation of the output document at which the origin of the print component 182 is to be positioned/rendered.

Figure 4:
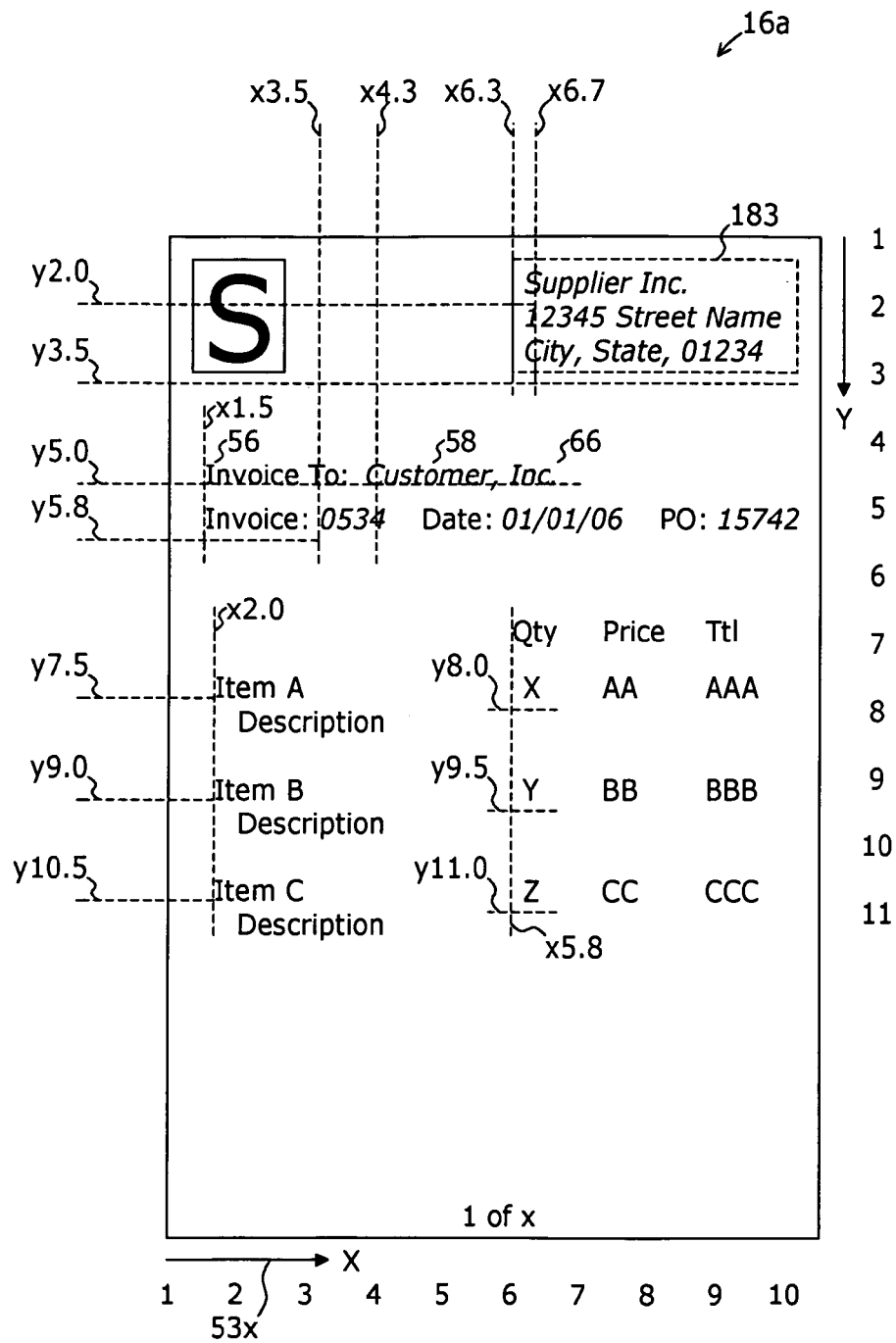
FIG. 4 depicts a graphic rendering of an invoice document object in accordance with an embodiment of the present invention.

For example, referring to FIG. 3 in conjunction with FIG. 4, print element 181a includes as its print component a graphic image 183 that includes, within the graphic image an image of characters representative of the vendor's name and address. The position identifier value 184 includes an abscissa value 184x of 6.3 and an ordinate value 184y of 3.5 defining the origin (which may be the lower left corner) of the graphic image 183 within a graphical representation of the output document object 16a as depicted in FIG. 4.

Print element 181b includes as its print component a character string of "Invoice To:". The position identifier value 184 includes an abscissa value 184x of 1.5 and an ordinate value 184y of 5.0 defining the origin (which may be the lower left corner commencing the character string) of the character string "Invoice To:" as depicted in FIG. 4.

Print element 181c includes as its print component a character string of "Customer, Inc." The position identifier value 184 includes an abscissa value 184x of 4.3 and an ordinate value 184y of 5.0 defining the origin (which may be the lower left corner commencing the character string) of the character string "Customer, Inc." as depicted in FIG. 4.

Print element 181d includes as its print component a character string of "Invoice:". The position identifier value 184 includes an abscissa value 184x of 1.5 and an ordinate value 184y of 5.8 defining the origin (which may be the lower left corner commencing the character string) of the character string "Invoice:" as depicted in FIG. 4.

Print element 181e includes as its print component a character string of "0534". The position identifier value 184 includes an abscissa value 184x of 3.5 and an ordinate value 184y of 5.8 defining the origin (which may be the lower left corner commencing the character string) of the character string "0534" as depicted in FIG. 4.

Print element 181f includes as its print component a character string of "Item A". The position identifier value 184 includes an abscissa value 184x of 2.0 and an ordinate value 184y of 7.5 defining the origin (which may be the lower left corner commencing the character string) of the character string "Item A" as depicted in FIG. 4.

Print element 181g includes as its print component a character string of "X". The position identifier value 184 includes an abscissa value 184x of 5.8 and an ordinate value 184y of 8.0 defining the origin (which may be the lower left corner commencing the character string) of the character string "X" as depicted in FIG. 4.

Print element 181h includes as its print component a character string of "Item B". The position identifier value 184 includes an abscissa value 184x of 2.0 and an ordinate value 184y of 9.0 defining the origin (which may be the lower left corner commencing the character string) of the character string "Item B" as depicted in FIG. 4.

Print element 181i includes as its print component a character string of "Y". The position identifier value 184 includes an abscissa value 184x of 5.8 and an ordinate value 184y of 9.5 defining the origin (which may be the lower left corner commencing the character string) of the character string "Y" as depicted in FIG. 4.

Print element 181j includes as its print component a character string of "Item C". The position identifier value 184 includes an abscissa value 184x of 2.0 and an ordinate value 184y of 10.5 defining the origin (which may be the lower left corner commencing the character string) of the character string "Item C" as depicted in FIG. 4.

Print element 181k includes as its print component a character string of "Z". The position identifier value 184 includes an abscissa value 184x of 5.8 and an ordinate value 184y of 11.5 defining the origin (which may be the lower left corner commencing the character string) of the character string "Z" as depicted in FIG. 4.

Returning to FIG. 2, to output the sequence of document objects 16a-16e, a user of a client system may select the print job function 12 for identifying the sequence of document objects 16a-16e for printing and select a "printer" from a list of available "printers" listed in the printer folder 15.

In one aspect of the present invention, the sequence of document objects 16a-16e may include a first sub set of documents 37a-37e of the sequence of document objects 16a-16e. At least one of: i) the first sub set of documents 37a-37e; and ii) an output data file 134 including at least certain invoice data element values embodied in each document of the first subset of documents 37a-37e is transferred from the print processor 30 to an automated data system 28.

In either case, a second subset of documents 38a-38c of the sequence of document objects 16a-16e may be transferred to a traditional printer queue 18 for printing by a traditional printer 24. In either case, the first set of documents 37a-37e and the second set of documents 38a-38c may be mutually exclusive.

Routing of the first subset of documents 37a-37e (or an output data file 134 which includes invoice data element values embodied in each document of the first subset of documents 37a-37e) to an automated data processing system 28 while routing the second subset of documents 38a-38c to a traditional printer for printing may be useful when a first portion of a vendor's customers utilize an automated data processing system 28 for receipt and processing of invoices while a second portion of the vendor's customers requires that its invoices be printed and mailed in a traditional manner.

The print processor 30 may comprise a print job source interface 17 for receiving the sequence of document objects 16a-16e from the print job source 10 when the user accessing the print job function 12 selects the virtual printer driver 30 as the printer to which the sequence of document objects 16a-16e is to be sent.

The print processor 30 may further include a print processor application function 46, an automated data processing client 19 (i.e. a module with operates as a client to the automatic data processing system 28), and a printer interface 21. In general, the application function 46 receives the sequence of document objects 16a-16e and, for each document, determines whether such document is part of the first set of documents 37a-37e or part of the second set of documents 38a-38c. The first sub-set of documents 37a-37e may be passed to the automated data processing client 19. Alternatively, in the aspect wherein a data capture module 110 (discussed herein) is implemented in the print processor 30, the first subset of documents 37a-37e are passed to the data capture module 110 which in turn generates the output data file 134 for transfer of invoice data elements from each document of the fist subset of documents 37*a*-37*e* to the automated data processing client 19. The documents 37*a*-37*e* may also be transferred with the output data file 134.

The automated data processing client 19 authenticates to, and establishes a network session 14 with, the remote automated data processing system 28 and, through such network session 14, transfers at least one of the first set of documents 37*a*-37*e* and/or the output data file 134.

In exemplary embodiments, the network session 14 may represent a TCP/IP connection established by the automated data processing client 19 to a web server and the automated data processing system 28. Alternatively, the network session 14 may be a web services session utilizing SOAP messaging between the automated data processing client 19 and compatible systems of the automated data processing system 28.

The second set of documents 38*a*-38*c* are passed to the printer interface 21. The printer interface 21 includes an interface 34 to the traditional printer queue 18 for passing the second set of documents 38*a*-38*c* to the traditional printer queue 18 for printing on a traditional printer 24.

The traditional printer queue 18 may buffer each document of the second set of documents 38*a*-38*c* in a traditional manner, convert the format to a printer language compatible with the printer 24 in a traditional manner, and utilize a port 22 to the printer 24 in a traditional manner for passing each document of the second set of documents 38*a*-38*c* to the printer for printing.

Further, the application 46 may generate an additional document 40 which lists or summarizes those documents of the first set of documents 37*a*-37*e* and pass such additional document 40 to the printer interface 21. As such, after printing each document of the second set of documents 38*a*-38*c*, the additional document 40 (e.g. the summary of the first set of documents 37*a*-37*e*) may also be printed at the printer 24.

Figure 5:
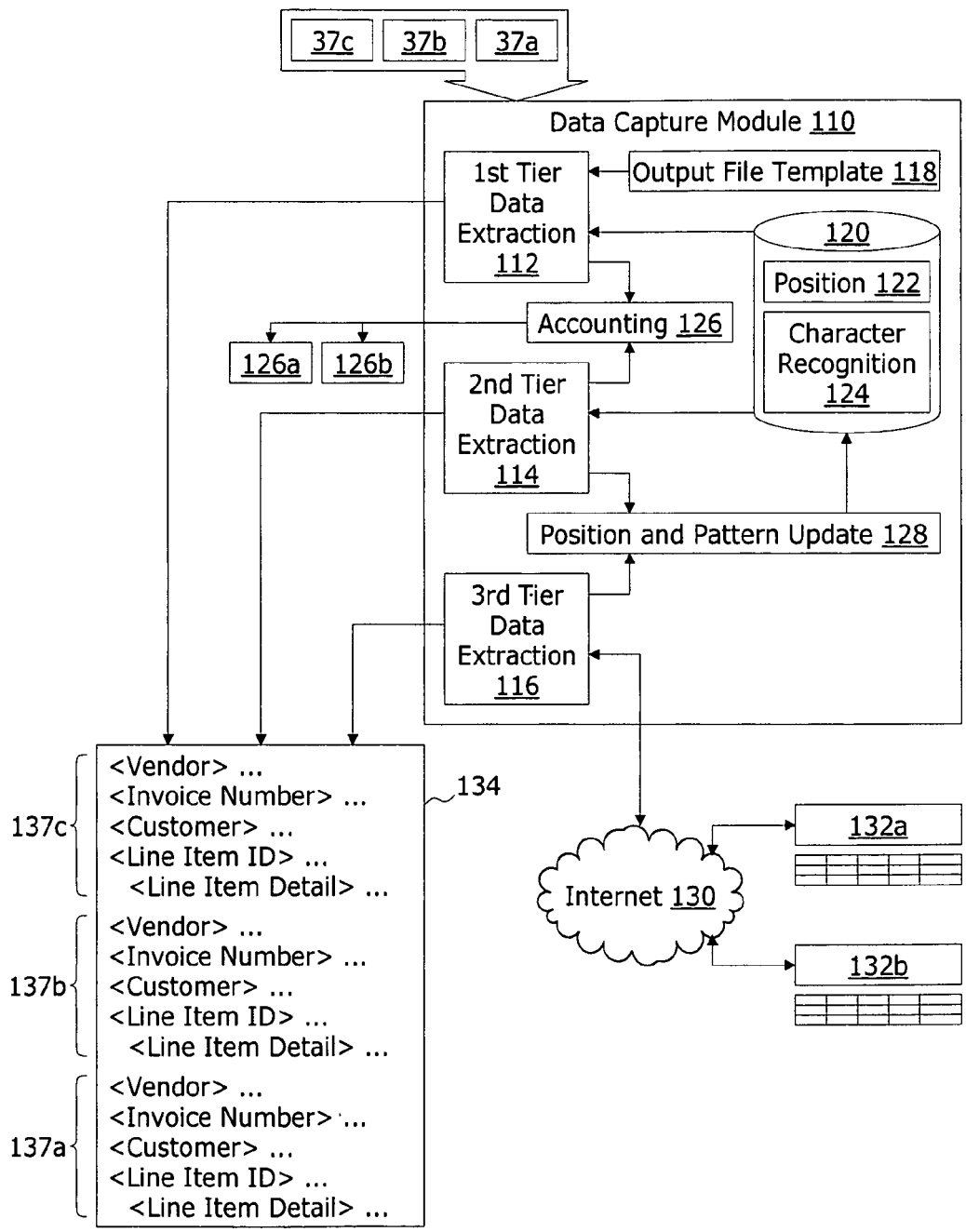
FIG. 5 is a block diagram depicting an exemplary implementation of a data capture module in accordance with an embodiment of the present invention.

Turning to FIG. 5, a block diagram representing exemplary structure and operation of a data capture module 110 is shown. As discussed, the data capture module 110 may be implemented within the print processor for purposes of receiving the first subset of invoice documents 37*a*-37*e* and writing output data values to an output data structure 134 for transfer to the automated data processing system 28.

The output data structure 134 may comprise an XML file that includes, for each output document 137*a*-137*c*, a corresponding set of data element values 137*a*-137*c*. Each set of data element values (for example element value set 137*c*) includes, for each required invoice data element 152 as defined in the output file template 118 (FIG. 6), the element value from the output document (in this example, output document 137*c*). Each set of data element values (i.e. data set 137*a*-137*c*) is formatted in accordance with the file output template 118.

The file output template 118 may be a traditional web services description language (WSDL) document defining required invoice data elements, XML tags and nesting for the required invoice data elements, and data value formatting and validation rules—for forming each data set 137*a*-137*c*.

Figures 6, 7:
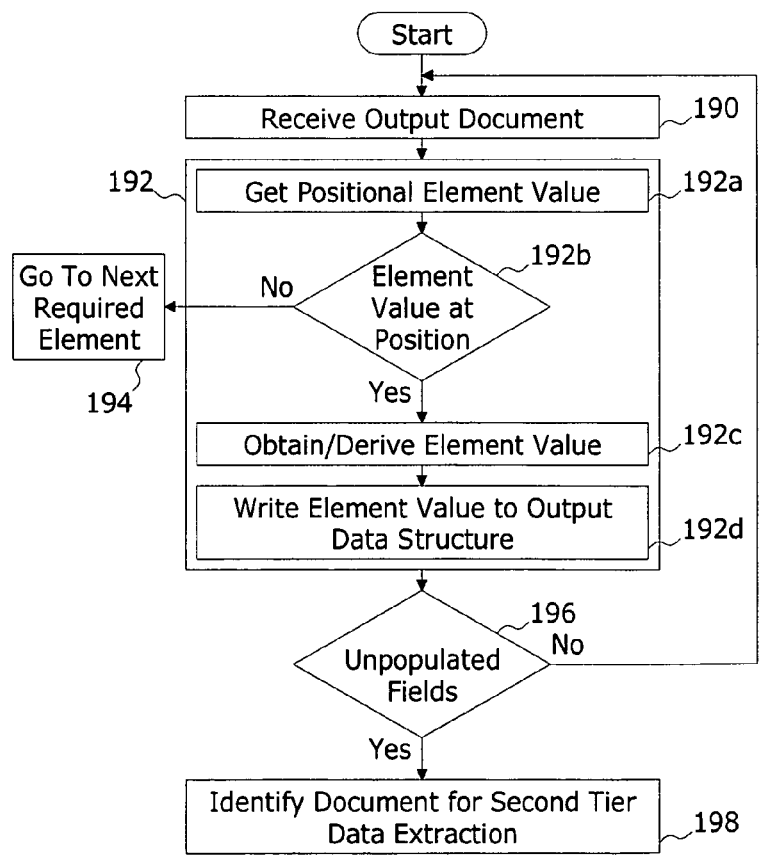
FIG. 6 is a diagram depicting an output file template in a tabular form in accordance with an embodiment of the present invention.
FIG. 7 is a flow chart depicting exemplary operation of a first tier data extraction system in accordance with an embodiment of the present invention.

For purposes of representation, FIG. 6 represents the information of an exemplary file output template 118 in a tabular format. Each record 150 represents a required invoice data element 152 and its association with at least an XML tag 154 and its data value rules 156. The order of the records 150 represents sequencing (and nesting) of the data element values (as an invoice data set 137*a*-137*c*) in an output file 134. Exemplary data value rules include: i) a specified quantity (or maximum quantity) of digits; ii) a specified quantity (or maximum quantity) of alpha-numeric characters; iii) a numerical value and maximum and/or minimum values thereof; iv) data formatting; v) similar data values rules.

As discussed with respect to FIG. 3 and FIG. 4, each invoice document (for example invoice document object 16*a* as represented by the print elements depicted in the table of FIG. 3 and as represented by the graphical image of the invoice document depicted in FIG. 4) may include a plurality of print elements 181*a*-181*k*—each of which includes a print component 182 and at least one position identifier value 184 (such as an abscissa value 184*x* and an ordinate value 184*y* defining a Cartesian coordinate within the graphical representation of the document) identifying a location at which the origin of the print component 182 is positioned within a graphic representation of the document.

Returning to FIG. 5 in conjunction with FIG. 3 and FIG. 4, for purposes of extracting the invoice element values from each document of the first subset of documents 37*a*-37*e* and populating such extracted data element values to the output data structure 134, the data capture module 110 includes a first tier data extraction system 112, a second tier data extraction system 114, and a third tier data extraction system 116.

In general, the first tier data extraction system 112 utilizes position data 122 to define a position within the document 37 at which an alpha and/or numeric representation (i.e. text representation) of the required invoice data element value is expected to exist. More specifically, the text (if any) which is positioned within graphical representation of the document (i.e. has an origin within the graphic image rendering of the document) within a predetermined variance from the position defined within the position data 122 is extracted as the invoice element value.

In general, the second tier data extraction system 114 utilizes character recognition data 124 to recover alpha numeric text and identify the position of such recovered text within a graphical representation of the document 37. The second tier system then utilizes the position data 122 in a similar manner as the first tier data extraction system 112 in that text (as recovered utilizing the character recognition data) which is positioned within the graphic rendering of the document (i.e. has an origin within the graphic rendering document) within a predetermined variance from the position defined within the position data 122 is extracted as the invoice element value.

In general, the third tier data extraction system 116 utilizes a server which operates to render an image of the invoice document 37, or only a limited portion of the invoice document, on a workstation 132*a*, 132*b* such that an operator may manually input the invoice element value. The limited portion of the document may be a portion of the document that includes the invoice element value but specifically excludes other information related to the significance of such value such that the operator may input the alpha-numeric characters representing the invoice element value without necessarily having access to what the characters represent—or even that the characters are an invoice element value.

The flow chart of FIG. 7 represents exemplary steps useful for implementing the first tier data extraction system 112 and the table of FIG. 8 represents exemplary positional identification (storage) data 122.

Turning to FIG. 7 in conjunction with FIG. 5 and FIG. 8, step 190 represents receiving the output document 37 which, as discussed with respect to FIG. 3, comprises a plurality of print elements 181—each of which comprises a print component 182 and a position identifier value 184.

Step 192 represents, for each required invoice data element (as defined in the output file template 118 as depicted in FIG. 6) obtaining the data element value from the output document 37. In more detail, sub step 192*a* represents obtaining a positional element value defining a location within the graphical representation of the document at an origin of a text string of at least one alpha-numeric character representative of the value of the invoice data element is positioned—or is expected to be positioned.

More specifically, the positional identification storage 122 may, as an example, associate identification of each required invoice data element 202a-202i its positional element value 204. The positional element value 204 may include an abscissa (or X axis) value 204x and an ordinate (or Y axis) value 204y which together define a Cartesian coordinate within the graphical representation of the document at which the text string representative of the value of the invoice data element is expected to be positioned.

In one aspect, each of the abscissa value 204x and the ordinate value 204y may be fixed values (for example the abscissa value of 6.7 and the ordinate value of 2.0 associated with invoice data element 202a) defining a fixed coordinate within the graphical representation of the document.

In another aspect, at least one of the abscissa value 204x and the ordinate value 204y may be a function of an abscissa value 204x and/or ordinate value 204y of one of the other invoice data elements (for example the ordinate value of "Previous Line Item ID +1.5 associated with invoice data element 202f) defining a coordinate within the graphic image that is fixed with respect to the other invoice data element.

The positional element value 204 may also include one or more variance values 204V defining a predetermined variance from the Cartesian coordinate defined by the abscissa value 204x and the ordinate value 204y. As such, the text string may be identified by its origin location being within the predetermined variance of the positional element value 204.

In one aspect, the variance 204v may be a value (for example a variance of 0.2 associated with invoice data element 202a) which defines, for example, a predetermined radius about the point defined by the abscissa value 204x and the ordinate value 204y.

In another aspect, the variance may be two values (for example a variance of x=0.7 and y=0.2 associated with invoice data element 202c) which define a predetermined rectangle (with a larger variation allotted for the Abscissa value 204x than for the ordinate value 204y).

Returning to FIG. 7, step 192b represent determining whether there exists a qualifying text string (i.e. a print element of alpha and/or numeric characters) that is associated with a position identifier value 184 (FIG. 3) that is within the predetermined variance 204v of the position element value (i.e. the Cartesian coordinate defined by the abscissa value 204x and the ordinate value 204y). This step may be performed by calculating a distance (within the Cartesian coordinate system) between the origin of the text string (the position identifier value 184) and the coordinate defined by the abscissa value 204x and the ordinate value 204y. If the distance is within the variance 204v, the text string is a qualifying text string.

In the event that there exists a qualifying text string, step 192c represents obtaining or deriving the element value from the qualifying text string. In more detail, the text string may require proper formatting as an element value. As examples, a text string of characters "0534" may be extracted as the numerical value of five hundred and thirty-four to derive an element value that is required to be a numerical value. Alternatively, the text string of "0534" may be extracted as four individual digits 0, 5, 3, 4 to derive an element value that is required to be a string of four individual digits.

After obtaining or deriving the element value, the element value is written to the output file 134 at step 192d—which may include writing the element value with proper tagging of the element value in XML format in accordance with the output file template 118 (i.e. WSDL document).

Returning briefly to step 192b, in the event that there is not a qualifying text string at the location or within the predetermined variance of the location defined by the positional element value 204, no element value can be obtained/derived and written to the output file 134. As such, step 192 is terminated and commenced for the next required invoice data element as represented by step 194.

After step 192 is performed for each required invoice data element, step 196 represents determining whether there remain unpopulated fields within the data set 137 of the output data structure 134—or more specifically, whether there are any required invoice data elements for which a qualified element value was not obtained at step 192.

If yes, meaning that there was a required invoice data element for which a qualified element value was not obtained at step 192, a tier two document is passed to the second tier data extraction system 114 at step 198. If all required invoice data elements are populated with qualified element values extracted by the tier one system, there is no need for passing a tire two document to the second tier data extraction system.

The tier two document may be one of: i) the output document 37—meaning the object comprising the plurality of print elements 180—inclusive, for each print element, its print component 192 and its position ID value 184 as represented by the table of FIG. 3; and/or ii) the graphical representation of the output document 37 (i.e. electronic paper or a bit mapped image of the document as depicted in FIG. 4).

Figure 9:
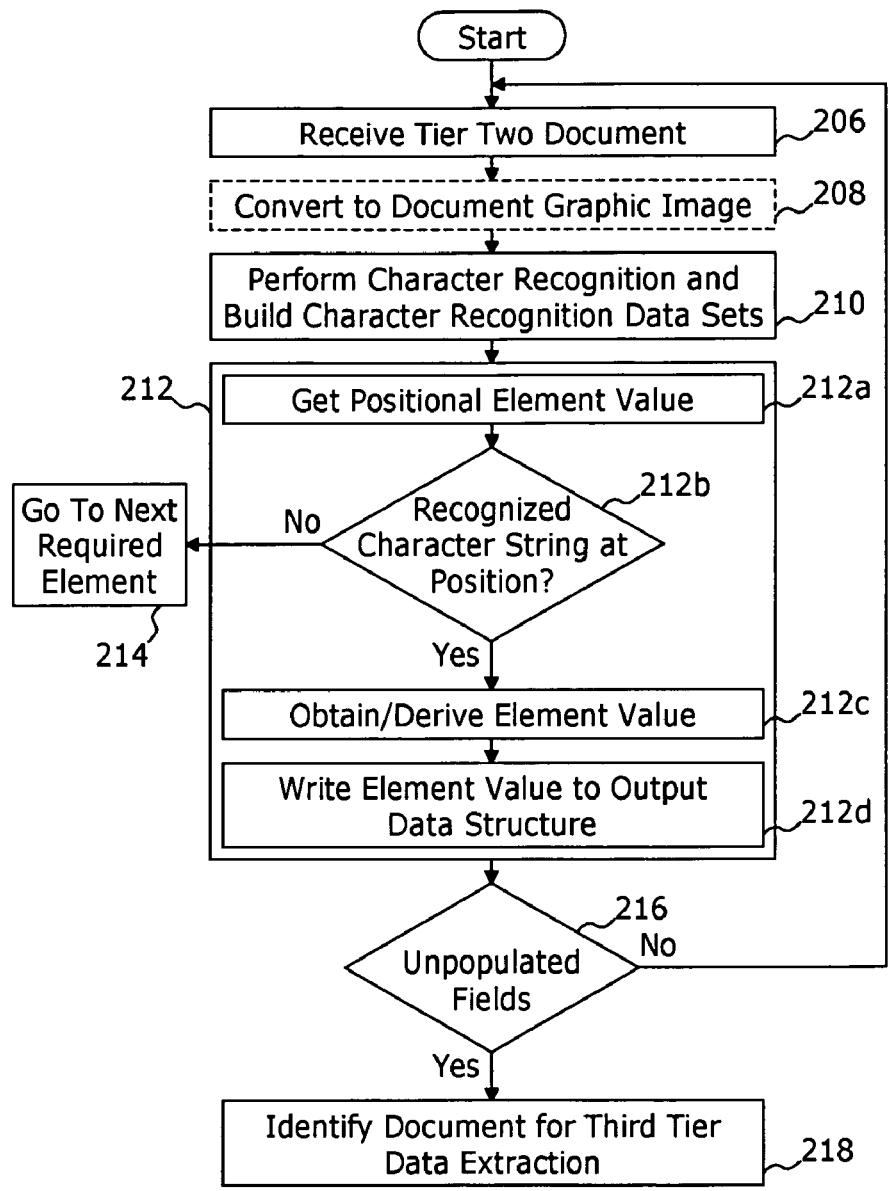
FIG. 9 is a flow chart depicting exemplary operation of a second tier data extraction system in accordance with an embodiment of the present invention.

The flow chart of FIG. 9 depicts exemplary steps for implementing the second tier data extraction system 114.

Step 206 represents receiving the tier two document. In the event that the tier two document is the output document 37, the document is converted to a graphical representation (i.e. electronic paper or bit mapped image) by executing a known function of printing (i.e. converting) the document to an image file format at step 208.

Step 210 represents utilizing the pattern/character shape recognition data to perform character recognition on the graphical representation (i.e. often called optical character recognition or OCR) to construct a plurality of character recognition data sets, each character recognition data set associating a recognized character string with identification of its location within the tier two document.

Turning briefly to FIG. 10, exemplary character recognition data sets 220 may include for each recognized character string, the sequence of alpha numeric characters recognized within the document 222 (i.e. by matching character pattern/character shape recognition data 124 to portions of the document where the bit map forms a corresponding shape representing the character) with a location 224 at which the character string is located. The location 224 may be Cartesian coordinate values at which the origin of the character string is located—meaning an abscissa value 224x and an ordinate value 224y.

Returning to FIG. 9, after constructing the plurality of character recognition data sets 220 for the various character strings recognized within the document (including characters strings which may be part of a graphic image 183 of a print component 182 of a print element (such as print element 181a depicted in FIG. 3), step 212 may be performed to obtain an invoice data element value for each required invoice data element for which a qualified data element value was not determined by the first tier data extraction system 112 (i.e. the unpopulated elements of the data set 137 of the output data structure 134).

More specifically, with reference to FIG. 8 in conjunction with FIG. 9, step 212a represents obtaining the positional element value 204 for the required invoice data element. Again, the positional element value 204 defines a location within the graphical representation of the document at which an origin of a text string (of at least one character) representing the invoice data element is positioned or is expected to be positioned.

With reference to FIG. 8 in conjunction with FIG. 9 and FIG. 10, step 212b represent determining whether one of the recognized character strings 222 is at the location specified by the positional element value 204 of the required invoice data element—or more specifically at a location within the variance 204v of the Cartesian coordinate defined by the positional element value 204 (i.e. a qualifying recognized character string).

If yes, element value is obtained or derived from the qualified recognized character string 222 at step 212c and written to the output data structure at step 212d—which may include writing the element value with proper tagging of the element value in XML format in accordance with the output file template 118 (i.e. WSDL document).

Returning briefly to step 212b, in the event that there is not a qualifying recognized character string at the location or within a predetermined variance of the location defined by the positional element value 204, no element value can be obtained/derived and written to the output data structure 134. As such, step 212 is terminated and commenced for the next required invoice data element as represented by step 214.

After step 212 is performed for each required element value, step 216 represents determining whether there remain unpopulated fields within the data set 137 of the output data structure 134—or more specifically, whether there are any required element values for which a qualified element value was not obtained at step 212 (or previously obtained by the first tier data extraction system 112 (FIG. 5).

If yes, meaning that there was a required element value for which a qualified recognized character string was not obtained at step 212, the tier two document is identified for third tier data extraction at step 218.

Referring back to FIG. 5, as discussed each tier two document that is identified for third tier data extraction is passed to the third tier data extraction system 116 which renders at least a selected portion of a graphical representation of the document on a workstation 132a for user input of any required invoice data elements not obtained by way of the first tier data extraction process or the second tier data extraction process. Accounting Referring again to FIG. 5, in yet another aspect of the present invention, the data capture module may further comprise an accounting server 126 communicatively coupled to at least the first tier data extraction system 112 and the second tier data extraction system 114. The accounting server 126 maintains an accounts receivables account 126a in favor of the operator of the data capture module 110 and a billing account 126b against which charges for operation of the data capture module 110 are charged to a customer—such as the invoice or a recipient of an invoice.

Figure 18:
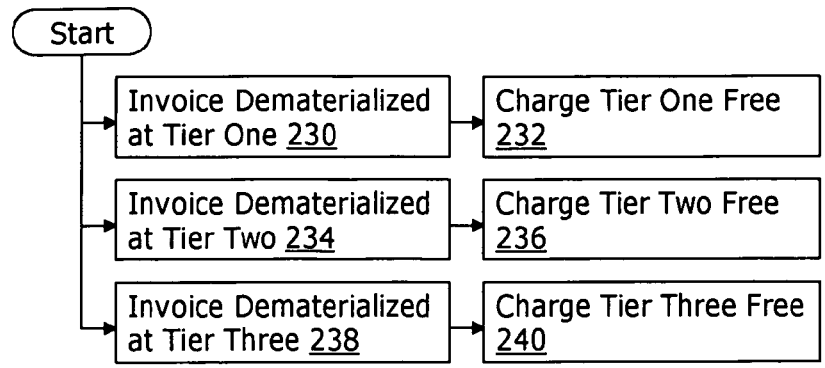
FIG. 18 is a flow chart depicting exemplary operation of an accounting server in accordance with an embodiment of the present invention.

The flow chart of FIG. 18 represents exemplary operation of the accounting server 126. Referring to FIG. 18 in conjunction with FIG. 5, if the invoice is completely dematerialized by the first tier data extraction system 112—meaning that the first tier data extraction system has populated an invoice element value for each required invoice element within the data set 137 of the output file 134 and/or generated a signal to the accounting server that such complete data extraction has occurred—as represented by step 230—then the accounting server 126 debits the billing account 126b and credits the AR account 126a for a tier one fee at step 232.

If tier two processing is required—meaning that the first tier data extraction system has not populated an invoice element value for each required invoice element—and the invoice is completely dematerialized by the second tier data extraction system 114—meaning that the second tier data extraction system has populated an invoice element value for each required invoice element within the data set 137 of the output file 134 (not populated by the first tier data extraction system) and/or generated a signal to the accounting server that such complete data extraction has occurred—as represented by step 234—then the accounting server 126 debits the billing account 126b and credits the AR account 126a for a tier two fee at step 236.

If tier three processing is required—meaning that the combination of the first tier data extraction system and the second tier data extraction system has not populated an invoice element value for each required invoice element—and complete invoice dematerialization requires manual entry by way of the third tier data extraction system 116 as represented by step 238, then the accounting server 126 debits the billing account 126b and credits the AR account 126a for a tier three fee at step 240.

In the exemplary embodiment, each of the tier one fee, tier two fee, and tier three fee are different charges with the tier one fee being the least expensive charge and the tier three fee being the most expensive charge.

FIRST SUB EMBODIMENT

Figure 11:
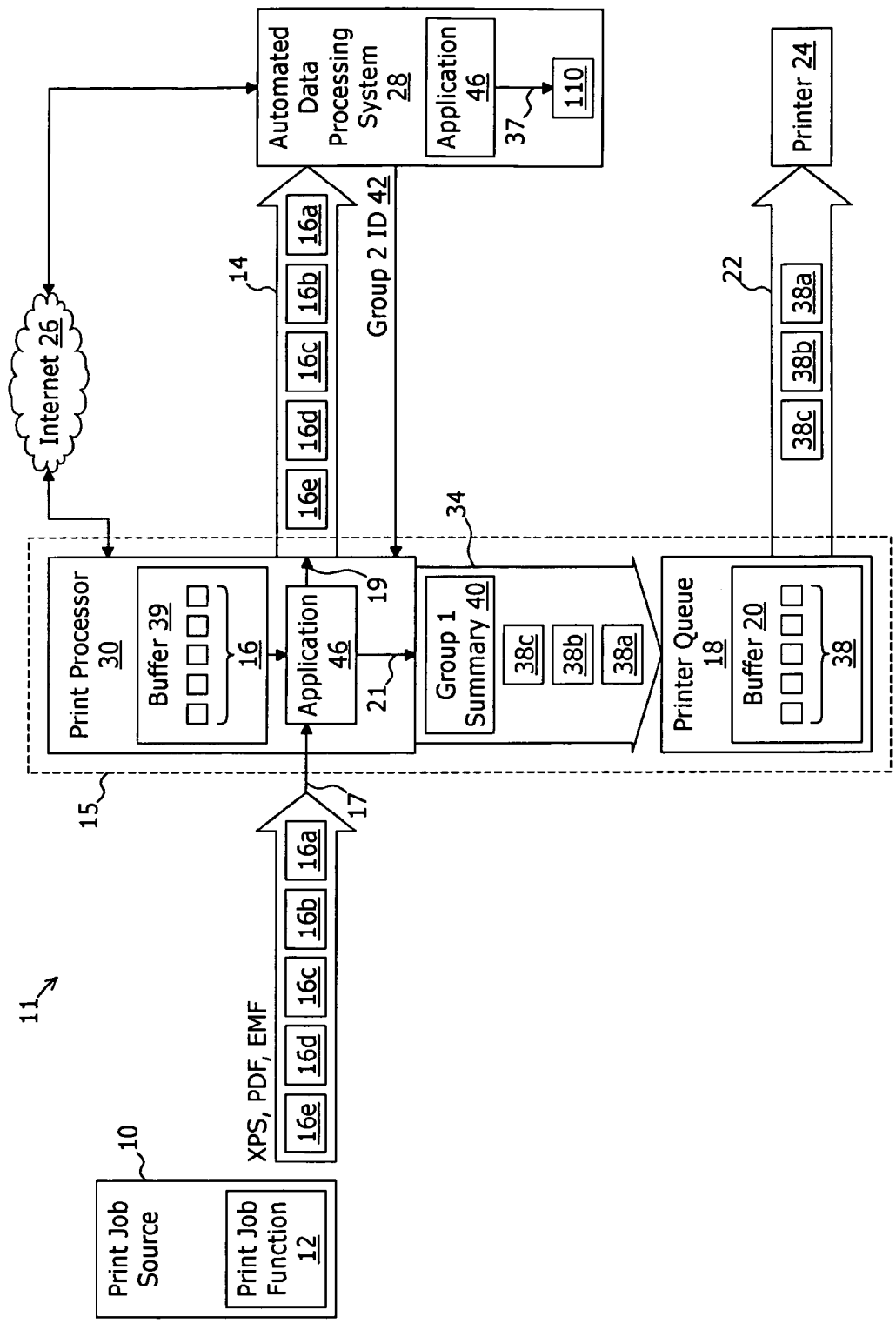
FIG. 11 is a block diagram representing a first sub embodiment of an architecture for routing a first portion of a sequence of documents to an automated data processing system while routing a second portion to a printer in accordance with an embodiment of the present invention.

The block diagram of FIG. 11 represents one sub embodiment of the print processor 30 and its operation in conjunction with the remote data processing system 28 wherein the data capture module 110 is embodied in the remote data processing system 28.

The print processor 30 of this sub embodiment includes a document buffer 39 for temporarily storing each document object of the sequence of document objects 16a-16e. In general, the application 46 directs the transfer of the entire sequence of document objects 16a-16e to the automated data processing system 28. The automated data processing system 28 returns a group 2 identification 42 which identifies those document objects, within the sequence of document objects 16a-16e which comprise the second set of documents 38a-38c. The application then directs the second set of documents 38a-38c (as identified by the group 2 identification 42) from the document buffer 39 to the printer interface 21 for printing by printer 24. The documents in the document buffer 39 which are not identified as part of the second set of documents 38a-38c are decimated.

Similarly, at the automated data processing system 28, the first set of documents 37a-37c are passed to the data capture module 110 and the second set of documents 38a-38c may be decimated.

Figure 16:
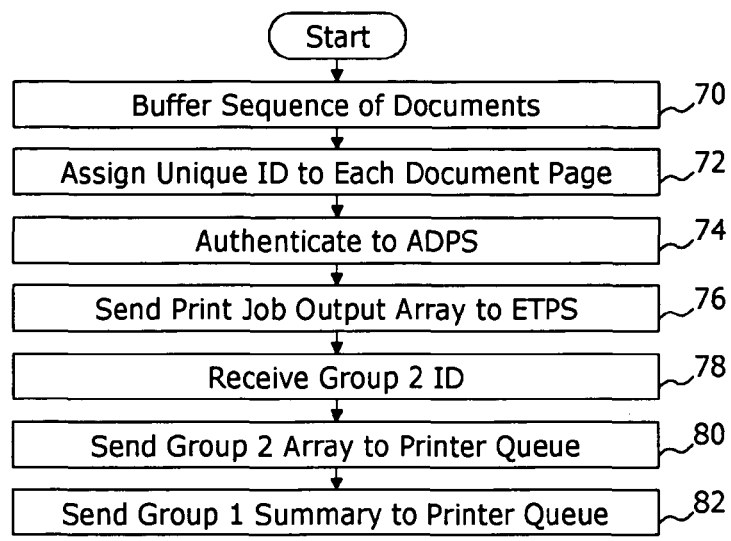
FIG. 16 is a flow chart representing an aspect of operation of a print processor in accordance with an embodiment of the present invention.

Turning to the flow chart of FIG. 16, in conjunction with FIG. 11, more detailed processing steps performed by the application 46 in support of this sub embodiment comprise buffering the sequence of document objects 16a-16e received from the print job source 12 in the document buffer 39 at step 70.

Step 72 represents assigning a unique identifier (such a document sequence number) to each document stored in the document buffer 39.

Step 74 represents directing the automated data processing client to authenticate to, and establishing the secure network session 14 with the remote automated data processing system 28 over the Internet 26.

Step 76 represents directing the automated data processing client to transfer the entire sequence of document objects 16a-16e to the automated data processing system through the secure network session 14.

Step 78 represents receiving the group 2 ID 42 from the remote automated data processing system 28. The group 2 ID 42 may include the unique identifier of each document that comprises the second set of documents 38a-38c, may be the unique identifier of each document that comprises the first set of documents 37a-37e, or other identifier that distinguishes which documents of the sequence of document objects 16a-16e are part of the second set of documents 38a-38c.

Step 80 represents obtaining those documents identified as documents of the second set of documents 38a-38c from the document buffer 39 and transferring such second set of documents 38a-38c to the printer queue 18 by the printer interface 21.

Step 82 represents generating the additional document 40 comprising the summary of the first set of documents (e.g. those documents not identified as part of the second set of documents 38a-38c by the group 2 ID 42) and sending such additional document to the printer queue 18 for printing by the printer 24.

It should be appreciated that although the flow chart of FIG. 16 represents each step performed in a linear manner, for larger sequences of document objects 16a-16e, all steps may be in process simultaneously. For example, the application 46 may commence the transfer of documents to the remote automated data processing system 28 while documents are still being received from the print job source 10. Further, signals representing the group 2 ID 42 may be received from the remote electronic transaction processing system 28 identifying documents of the second set 38a-38c while other documents of the sequence of document objects 16a-16e are still being transferred to the remote automated data processing system 28. As such, the application 46 may also be directing documents of the second set of documents 38a-38c to the printer queue 18 while still receiving documents from the print job source and while still transferring documents to the automated data processing system 28. Such simultaneous operation reduces the size of the document buffer 39 that would be required.

SECOND SUB EMBODIMENT

Figure 12:
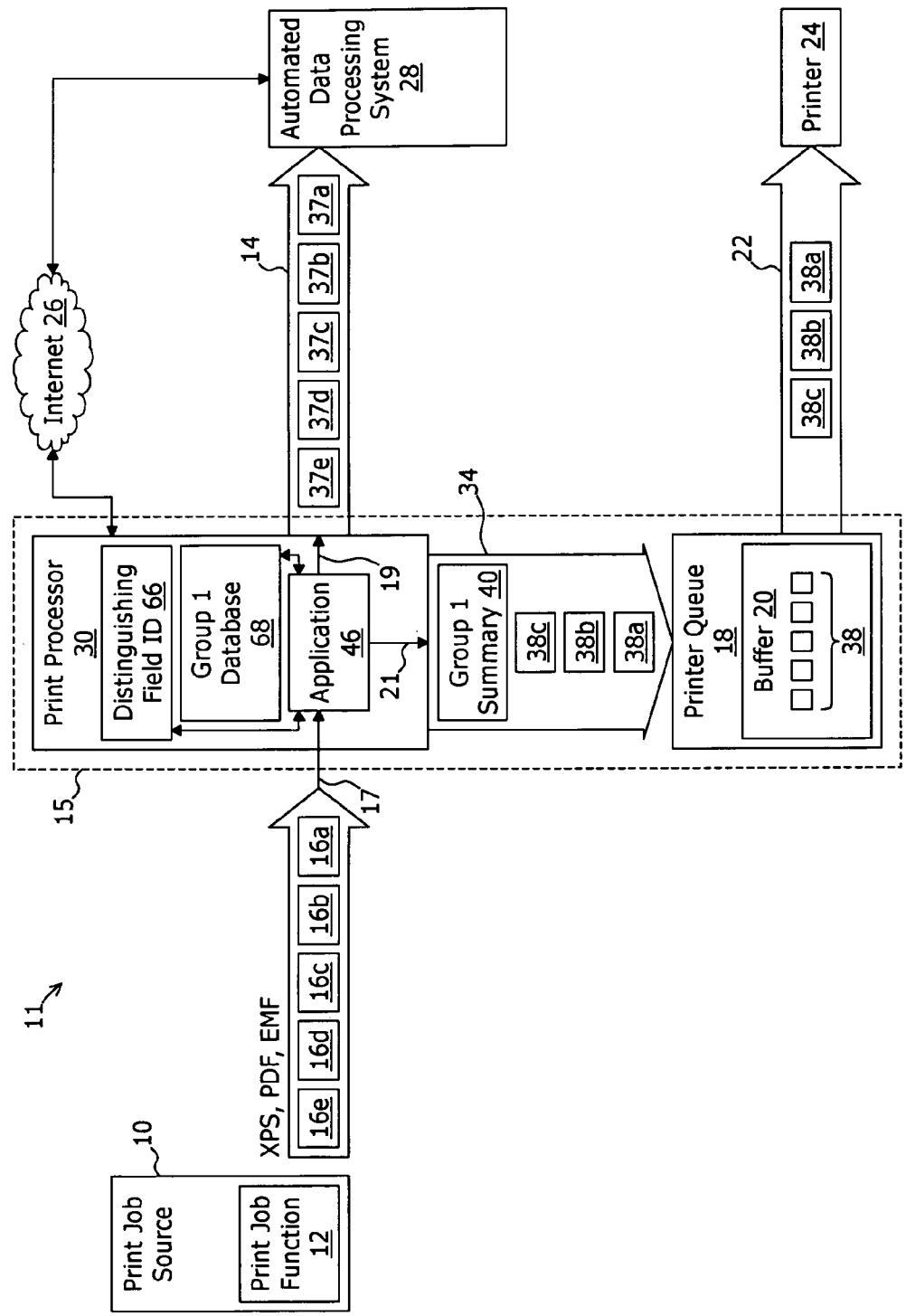
FIG. 12 is a block diagram representing a second sub embodiment of an architecture for routing a first portion of a sequence of documents to an automated data processing system while routing a second portion to a printer in accordance with an embodiment of the present invention.

The block diagram of FIG. 12 represents a second sub embodiment of the print processor 30 and its operation in conjunction with the remote data processing system 28.

The print processor 30 of this sub embodiment includes a group 1 database 68 and a distinguishing field identifier 66.

The group 1 database 68 comprises a listing one or more characteristics for identifying whether a document object 16a-16e is part of the first set of documents 37a-37e. In the embodiment wherein the sequence of document objects 16a-16e are invoices, the characteristic may be the company name of the customer to which the invoice is directed. As such, the listing of characteristics of the group 1 database 65 may be a listing of customers that utilize the automated data processing system 28 such that invoices directed to such customers are part of the first set of documents 37a-37e.

The distinguishing field identifier 66 comprises instructions to enable the application 46 to locate the characteristic in a document object 16 that, if matched to the listing of characteristics in the group 1 database, results in a determination that such document is part of the first set of documents 37a-37e and is transferred to the automated data processing system 28.

Figure 13B:
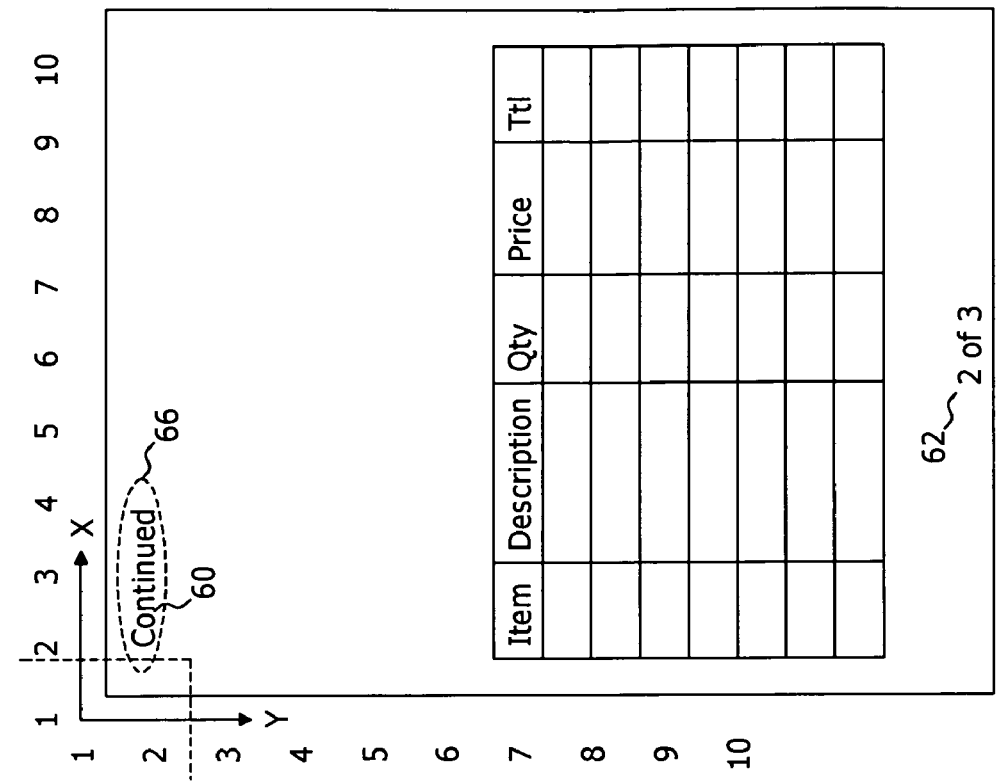
FIG. 13b is a graphic representation of an invoice document in accordance with an embodiment of the present invention.
Figure 13A:
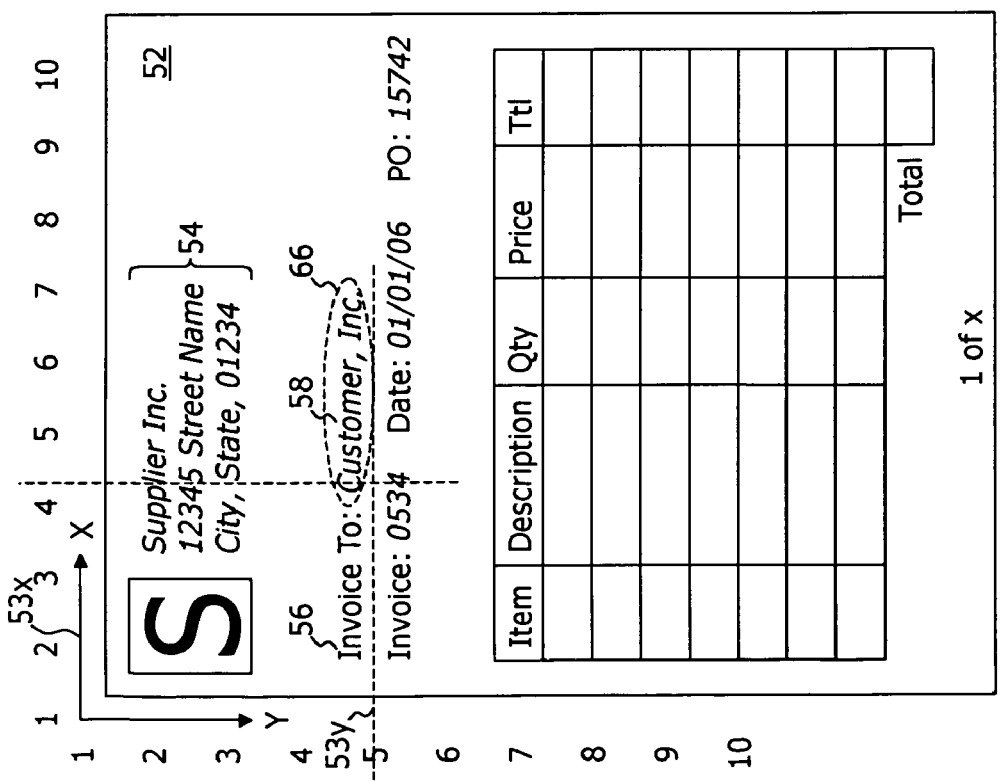
FIG. 13a is a graphic representation of an invoice document in accordance with an embodiment of the present invention.

Turning briefly to FIG. 13a wherein an invoice 52 is represented in graphic form, the distinguishing field identifier 66 may be a location within a graphical representation of the document wherein customer identification text string 58 is located. Turning briefly of FIG. 14 in conjunction with FIG. 13a, the location 66 may be identified by: i) coordinates 66a such as horizontal 53x and vertical 53y coordinates from a fixed point such as the upper left corner of the document 52; ii) a preceding character string 66b such as a character string "Invoice To:" 56 which precedes the customer identification text 58; or iii) a metadata tag 66c which may be a hidden text tag that is not printed on a graphic representation of the invoice 52 but can be utilized for identifying the customer identification text string 58 within the document object.

Turning briefly to FIG. 13b, for purposes of invoices comprising multiple pages, the distinguishing field identifier 66 may also be a location within a graphical representation of the document wherein additional page identification text 60 is located. This facilitates identifying a document object 16 which is assigned to either the first set of documents 37a-37e or the second set of documents 38a-38e in conjunction with the preceding document object 16 as opposed to an independent document.

Again, the distinguishing field identifier may be coordinates, a preceding character string, or a metadata data tag. Examples of additional page identification text include the text "continued" 60 or a page number identifier 62 wherein the page number is greater than 1, but less than or equal to the total number of pages (e.g. 2 of 3 or 3 of 3 for example).

Turning briefly to FIG. 15, an exemplary group 1 database 68 is shown. The group 1 database may comprise a plurality of records 70. Each record may identify the group 1 recipient identification string such as the company name of a customer that utilizes the automated data processing system 28 such that invoices directed to such customers are part of the first set of documents 37a-37e.

Because customers register with the automated data processing system 28, it is possible that the syntax of the customer's name as input by the customer to the automated data processing system 28 does not exactly match the syntax of the customer's name as input by the invoicer into its accounting system 10. As such, associated with each record 70 may be a plurality of identifiers 72, each of which is an alternative syntax of the customer's name. In operation, the application may utilizes the identifiers 72 as the group 1 recipient identification strings for determining whether an invoice is part of the first set of documents 37a-37e.

Figure 17:
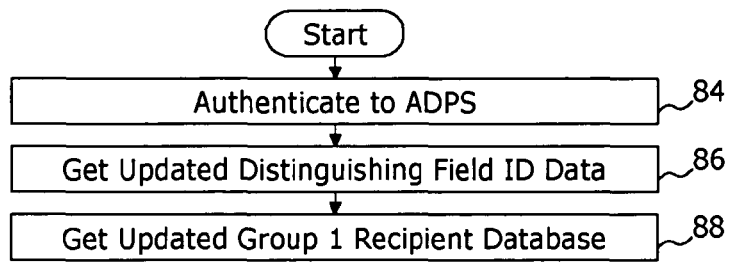
FIG. 17 is a flow chart representing an aspect of operation of a print processor in accordance with an embodiment of the present invention.

The flow chart of FIG. 17 represents exemplary operation of an aspect of the application 46 wherein the application 46 obtains from the automated data processing system, both the distinguishing field identifier 66 and the data for populating the group 1 database 68. In more detail, with reference to FIG. 17 in conjunction with FIG. 12, step 84 represents the application 46 authenticating to, and establishing a session with the automated data processing system 28. Step 86 represents the application 46 obtaining updated distinguishing field identifier data and step 89 represents the application 46 obtaining updated group 1 database data.

It should be appreciated that as additional customers commence use of the automated data processing system 28 for receiving invoice data (or customers discontinue use of the automated data processing system 28), the records 70 and identifiers 72 (FIG. 15) of the group 1 database 68 will require updating—and are updated in accordance with steps of the flow chart of FIG. 17.

Further, in the event that the accounting system (or other print job source 10) is modified such that the document format is modified, the distinguishing field ID 66 may require modification.

As such, the application 46 may periodically executes the steps of the flow chart of FIG. 17 for purposes of updating the group 1 database 68 and the distinguishing field identifier 66.

Figure 19:
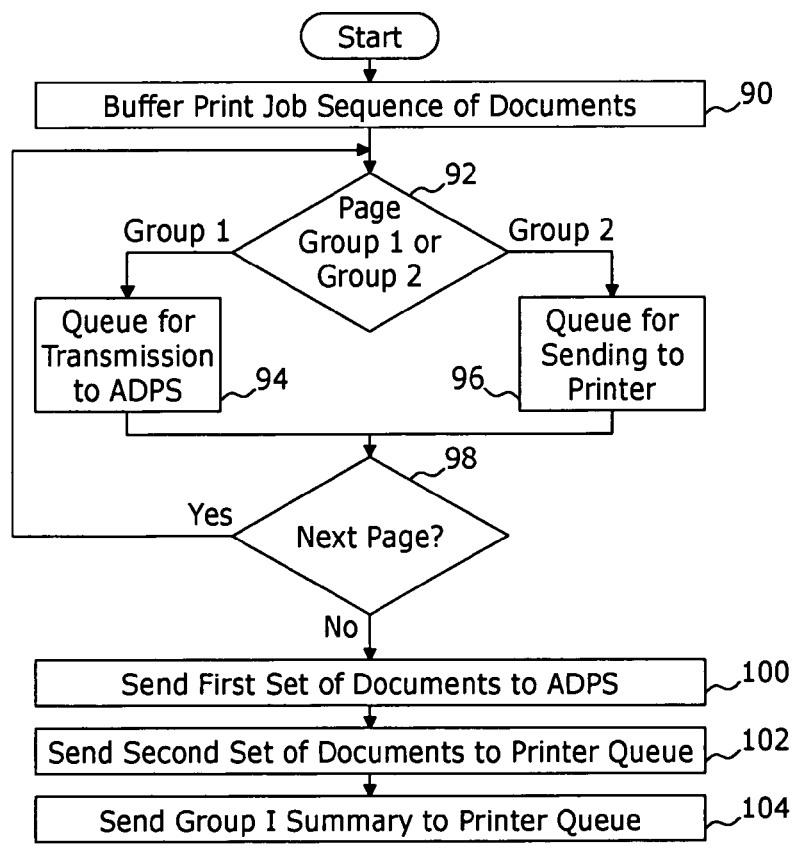
FIG. 19 is a flow chart representing an aspect of operation of a print processor in accordance with an embodiment of the present invention.

The flow chart of FIG. 19 represents exemplary operation of an aspect of the application 46 (whether operating within the print processor 30 pursuant to the second sub embodiment or operating within the automated data processing system 28 in accordance with the first sub embodiment) wherein the application 46 receives the sequence of document objects 16a-16e and determines whether each document object (e.g. each page) 16 of the sequence of document objects 16a-16e is part of the first set of documents 37a-37e or the second set of documents 38a-38c. Referring to FIG. 19 in conjunction with FIG. 11 and FIG. 12, step 90 represents the application receiving the sequence of document objects 16a-16e from the print job source 10 and buffering such sequence.

Step 92 represents, for each document, matching the text located at the distinguishing field identifier with the data of the group 1 database (e.g. the records 70 and identifier 72 of FIG. 15) to determine whether the document is assigned to the first set of documents 37a-37e or the second set of documents 38a-38c.

If the document is assigned to the first set of documents 37a-37e, the document is queued for transmission to the automated data processing system 28. If the document is assigned to the second set of documents 38a-38, the document is queued for sending to the printer 24 (e.g. for direction to the print driver spooler 18) at step 96.

Step 98 represents a determination of whether additional documents in the sequence of document objects 16a-16e exist. If yes, step 92 is executed for the next document object 16 in the sequence of document objects 16a-16e.

Step 100 represents sending the first set of documents 37a-37e to the automated data processing system. As discussed, step 100 may comprise authenticating to, and establishing a secure session 14 with the automated data processing system and transferring the first set of documents 37a-37e in a secure manner.

Step 102 represents directing the second set of documents 38a-38c to the printer by directing the second set of documents 38a-38c to the printer queue 18 via the interface 34 therewith.

Step 104 represents generating the additional document 40 summarizing the documents assigned to the first set of documents 38a-38e and directing such additional document 40 to the printer 24.

It should also be appreciated that although the flow chart of FIG. 19 represents each step performed in a linear manner, for larger sequences of document objects 16a-16e, all steps may be in process simultaneously. For example, the application 46 may commence the transfer of documents to the remote automated data processing system 28 and to the print driver spooler 18 while documents are still being received from the print job source 10. Such simultaneous operation reduces the size of a buffer that would be required for storing documents.

SUMMARY

In summary, the present invention provides for each document object of a sequence of document objects generated by a print job source to be automatically directed to one of an automated data processing system or a printer based on distinguishing characteristics. Those documents directed to the automated data processing system may be dematerialized in accordance with a multi-tier dematerialization system.

Although the invention has been shown and described with respect to certain preferred embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of system of the present invention. The present invention includes all such equivalents and modifications, and is limited only by the scope of the following claims.

What is claimed is:

1. A data capture system for receipt of a sequence of at least one output document object and, for each output document object, writing output data values to an output data structure, the system comprising:
   a non-transitory data storage comprising:
      a positional identification storage including at least two positional data sets, each positional data set includes:
         i) identification of a required invoice data element; and
         ii) identification of a positional element value defining a location within a graphical representation of each output document object at which a text string representative of a value of the required invoice data element is positioned;
   a first tier data extraction system adapted to receive each output document object, each output document object being in a print language format comprising a plurality of print elements, each print element including a print component and at least one position identifier value identifying a position at which the print component is rendered within a graphical representation of the output document object, each print component being one of: i) a text string representing a value of an invoice data element; and ii) a graphic image, the first tier data extraction system being further adapted to, for each received output document object:
      for each required invoice data element:
         obtain the identification of the positional element value from the positional data set that includes, as its invoice data element, identification of the required invoice data element;
         if the output document object includes a qualifying text string, write an output data value to the output data structure in association with identification of the required invoice data element, the output data value being one of: i) at least a portion of the qualifying text string; and ii) a numerical value represented by at least a portion of the qualifying text string, wherein a qualifying text string is a text string of a print element that includes a position identifier value that is within a predetermined variance from the positional element value of the positional data set; and
         if the output document object does not include a qualifying text string, identifying the output document object for tier two processing;
   a second tier data extraction system adapted to receive, for each output document object identified for tier two processing, a tier two document, the tier two document being the graphical representation of the output document object, the second tier data extraction system being further adapted to:
  perform character recognition on the tier two document and construct a plurality of character recognition data sets, each character recognition data set associating a recognized character string within the tier two document and an identification of its location within the tier two document; and
  for each required invoice data element for which the first tier data extraction system failed to write an output data value to the output data structure:
    obtain the identification of the positional element value from the positional data set that includes, as its invoice data element, identification of the required invoice data element; and
    if a character recognition data set includes a qualifying recognized character string, write an output data value to the output data structure in association with identification of the required invoice data element, the output data value being one of: i) at least a portion of the qualifying recognized character string; and ii) a numerical value represented by at least a portion of the qualifying recognized character string, wherein a qualifying recognized character string is a recognized character string of a character recognition data set that includes a position identifier value that is within a predetermined variance from the positional element value of the positional data set.

2. The data capture system of claim 1, wherein the second tier data extraction system is further adapted to:
  if a qualifying recognized character string is not included in any character recognition data set constructed for a tier two document, identifying the tier two document for tier three processing; and
  a third tier identification system adapted to, for each tier two document identified for tier three processing:
    generate a graphical representation of the tier two document at a workstation; and
    for each required invoice data element for which the second tier data extraction system failed to write an output data value to the output data structure:
      prompt for user input of an output data value;
      receive user input of the output data value from the workstation; and
      write, to the output data structure, the output data value received from the workstation in association with identification of the required invoice data element.

3. The data capture system of claim 2, wherein:
  at least one positional element value includes an abscissa value and an ordinate value defining a Cartesian coordinate within the graphical representation of the output document object at which an origin of the text string is positioned; and
  a qualifying text string is a text string of a print element that includes a position identifier value identifying a position within the graphical representation of the output document object that is within a predetermined displacement from the Cartesian coordinate.

4. The data capture system of claim 3, wherein a qualifying recognized character string is a recognized character string of a character recognition data set that includes a position identifier value identifying a position within the graphical representation of the output document object that is within a predetermined displacement from the Cartesian coordinate.

5. The data capture system of claim 2, wherein:
  at least one positional element value includes:
    a reference to a second invoice data element;
    an abscissa value; and
    an ordinate value;
    wherein: i) the abscissa value added to an abscissa value of the second invoice data element; and ii) the ordinate value added to an ordinate value of the second invoice data element define a Cartesian coordinate within the graphical representation of the output document object at which an origin of the text string is positioned; and
  wherein a qualifying text string is a text string of a print element that includes a position identifier value identifying a position within the graphical representation of the output document object that is within a predetermined displacement from the Cartesian coordinate.

6. The data capture system of claim 5, wherein a qualifying recognized character string is a recognized character string of a character recognition data set that includes a position identifier value identifying a position within the graphical representation of the output document object that is within a predetermined displacement from the Cartesian coordinate.

7. The data capture system of claim 2, wherein:
  the graphic image of at least one print component includes a pixelized representation of at least one character; and
  the recognized character string of at least one character recognition data set includes characters matching characters of the pixelized representation of at least one character.

8. The data capture system of claim 2, further comprising an accounting server, the accounting server:
  crediting an account for a first charge in the event all required invoice data elements are written to the output data structure by the first tier data extraction system;
  crediting the account for a second charge, different than the first charge, in the event:
    any required invoice data elements are written to the output data structure by the second tier data extraction system; and
    the output document object is not identified for tier three processing; and
  crediting the account for a third charge, different than both the first charge and the second charge, in the event the output document object is identified for the tier three processing.

9. A method for capturing data from a sequence of at least one output document object and, for each output document object, writing output data values to an output data structure, the method comprising:
  storing at least two positional data sets in a non-transitory data storage each positional data set includes:
    i) identification of a required invoice data element; and
    ii) identification of a positional element value defining a location within a graphical representation of each output document object at which a text string representative of a value of the required invoice data element is positioned;

receiving each output document object, each output document object being in a print language format comprising a plurality of print elements, each print element including a print component and at least one position identifier value identifying a position at which the print component is rendered within a graphical representation of the output document object, each print component being one of: i) a character string representing a value of an invoice data element; and ii) a graphic image;

for each required invoice data element, performing a first tier data extraction process, the first tier data extraction process comprising:
  obtaining the identification of the positional element value from the positional data set that includes, as its invoice data element, identification of the required invoice data element;
  if the output document object includes a qualifying text string, write an output data value to the output data structure in association with identification of the required invoice data element, the output data value being one of: i) at least a portion of the qualifying text string; and ii) a numerical value represented by at least a portion of the qualifying text string, wherein a qualifying text string is a text string of a print element that includes a position identifier value that is within a predetermined variance from the positional element value of the positional data set; and
  if the output document object does not include a qualifying text string, identifying the output document object for tier two processing;

for each output document object identified for tier two processing, perform a second tier data extraction process, the second tier data extraction process comprising:
  performing character recognition on a graphical representation of the output document object and construct a plurality of character recognition data sets, each character recognition data set associating a recognized character string within the graphical representation with an identification of its location within the graphical representation; and
  for each required invoice data element for which an output data value was not written to the output data structure by the first tier data extraction process:
    obtain the identification of the positional element value from the positional data set that includes, as its invoice data element, identification of the required invoice data element; and
    if a character recognition data set includes a qualifying recognized character string, write an output data value to the output data structure in association with identification of the required invoice data element, the output data value being one of: i) at least a portion of the qualifying recognized character string; and ii) a numerical value represented by at least a portion of the qualifying recognized character string, wherein a qualifying recognized character string is a recognized character string of a character recognition data set that includes a position identifier value that is within a predetermined variance from the positional element value of the positional data set.

10. The method of claim 9, further comprising:
if a qualifying recognized character string is not included in any character recognition data set constructed for a tier two document, identifying the tier two document for tier three processing; and
for each tier two document identified for tier three processing, performing a third tier data extraction process, the third tier data extraction process comprising:
  generating a graphical representation of the tier two document at a workstation; and
  for each required invoice data element for which the second tier data extraction process failed to write an output data value to the output data structure:
    prompting for user input of an output data value;
    receiving user input of the output data value from the workstation; and
    writing, to the output data structure, the output data value received from the workstation in association with identification of the required invoice data element.

11. The method of claim 10, wherein:
at least one positional element value includes an abscissa value and an ordinate value defining a Cartesian coordinate within the graphical representation of the output document object at which an origin of the text string is positioned; and
a qualifying text string is a text string of a print element that includes a position identifier value identifying a position within the graphical representation of the output document object that is within a predetermined displacement from the Cartesian coordinate.

12. The method of claim 11, wherein a qualifying recognized character string is a recognized character string of a character recognition data set that includes a position identifier value identifying a position within the graphical representation of the output document object that is within a predetermined displacement from the Cartesian coordinate.

13. The method of claim 10, wherein:
at least one positional element value includes:
  a reference to a second invoice data element;
  an abscissa value; and
  an ordinate value;
  wherein: i) the abscissa value added to an abscissa value of the second invoice data element; and ii) the ordinate value added to an ordinate value of the second invoice data element define a Cartesian coordinate within the graphical representation of the output document object at which an origin of the text string is positioned; and
wherein a qualifying text string is a text string of a print element that includes a position identifier value identifying a position within the graphical representation of the output document object that is within a predetermined displacement from the Cartesian coordinate.

14. The method of claim 13, wherein a qualifying recognized character string is a recognized character string of a character recognition data set that includes a position identifier value identifying a position within the graphical representation of the output document object that is within a predetermined displacement from the Cartesian coordinate.

15. The method of claim 10, wherein:
the graphic image of at least one print component includes a pixelized representation of at least one character; and
the recognized character string of at least one character recognition data set includes characters matching characters of the pixelized representation of at least one character.

16. The method of claim 10, further comprising:
crediting an account for a first charge in the event all required invoice data elements are written to the output data structure by the first tier data extraction process;
crediting the account for a second charge, different than the first charge, in the event:
- any required invoice data elements are written to the output data structure by the second tier data extraction process; and
- the output document object is not identified for tier three processing; and crediting the account for a third charge, different than both the first charge and the second charge, in the event the output document object is identified for the tier three processing.

* * * * *